United States Patent
Erbe et al.

(10) Patent No.: US 9,891,402 B2
(45) Date of Patent: Feb. 13, 2018

(54) OPTICAL MOUNT COMPRISING AT LEAST ONE CLAMPING UNIT WITH AN ADHESIVE GAP

(71) Applicant: JENOPTIK Optical Systems GmbH, Jena (DE)

(72) Inventors: Torsten Erbe, Jena (DE); Frank Schroeder, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

(21) Appl. No.: 15/429,457

(22) Filed: Feb. 10, 2017

(65) Prior Publication Data

US 2017/0235085 A1 Aug. 17, 2017

(30) Foreign Application Priority Data

Feb. 12, 2016 (DE) .................. 10 2016 102 469

(51) Int. Cl.
*G02B 7/00* (2006.01)
*F16B 2/06* (2006.01)

(52) U.S. Cl.
CPC ............. *G02B 7/00* (2013.01); *F16B 2/065* (2013.01)

(58) Field of Classification Search
CPC . F41G 11/003; F41G 1/38; F41G 1/35; F41G 3/06; F41G 1/473; F41G 11/001; F41G 1/345; F41G 3/08; F41G 11/004
USPC ............. 248/187.1; 403/7; 42/111, 119, 124; 359/630, 819, 820; 211/64
See application file for complete search history.

(56) References Cited

U.S. PATENT DOCUMENTS

| | | | |
|---|---|---|---|
| 5,493,452 A * | 2/1996 | Hoshino | G02B 7/025 359/811 |
| 6,014,269 A * | 1/2000 | Nomura | G02B 7/102 359/700 |
| 6,191,898 B1 | 2/2001 | Trunz et al. | |
| 6,204,977 B1 * | 3/2001 | Iwasa | G02B 7/102 359/700 |
| 6,441,975 B1 * | 8/2002 | Ebert | G02B 7/00 359/811 |
| 7,916,408 B2 | 3/2011 | Blanding et al. | |
| 2015/0092105 A1 * | 4/2015 | Brinks | G03B 17/12 348/374 |

FOREIGN PATENT DOCUMENTS

| | | |
|---|---|---|
| DE | 199 01 295 A1 | 7/2000 |
| DE | 102 29 623 A1 | 1/2004 |
| DE | 10 2013 109 605 B3 | 6/2014 |
| DE | 10 2015 101 384 B3 | 11/2015 |

* cited by examiner

*Primary Examiner* — Steven M Marsh
(74) *Attorney, Agent, or Firm* — Duane Morris LLP

(57) ABSTRACT

An optical mount, comprising an outer ring (1), an inner ring (2), at least two manipulator units, by means of which the inner ring (2) is adjustable with respect to the outer ring (1) in an adjustment plane perpendicular to a mount axis, and at least one clamping unit (0) acting independently of the manipulator units. The clamping unit (0) is formed by a threaded hole (4), which is directed radially to the mount axis (1.1) in the outer ring (1), and a screw (5) supported in said threaded hole (4), said screw (5) having a through hole (8) along the screw axis (5.0) which is connected with the inner ring (2) in the clamping condition via an adhesive gap (7) filled with adhesive (6).

11 Claims, 4 Drawing Sheets

OPTICAL MOUNT COMPRISING AT LEAST ONE CLAMPING UNIT WITH AN ADHESIVE GAP

RELATED APPLICATIONS

Figure 1:
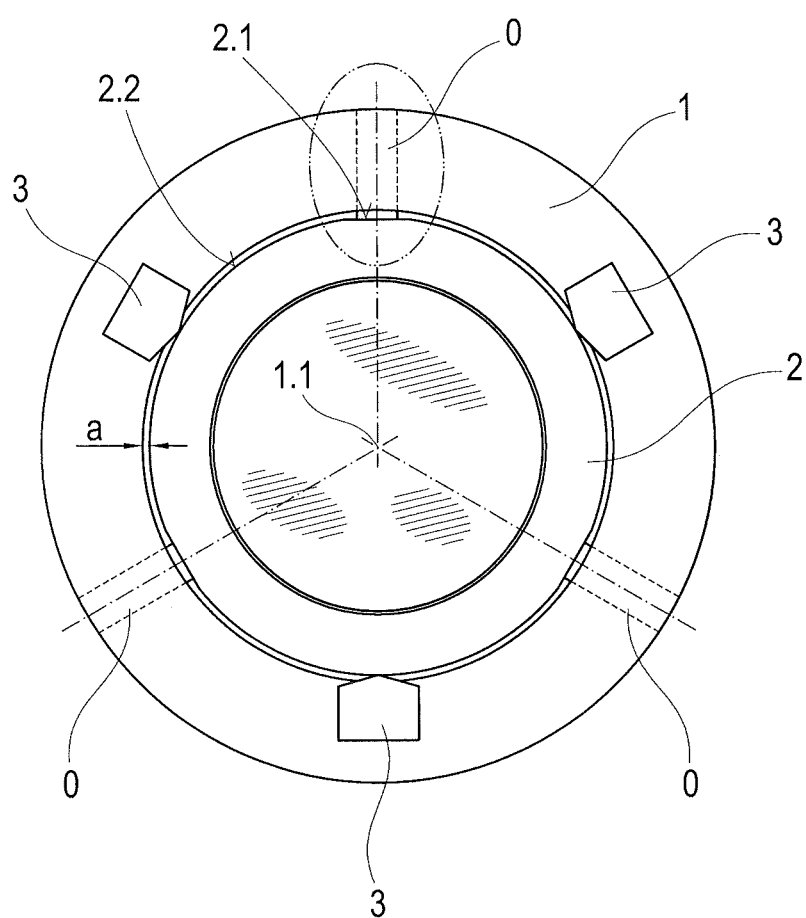

The present application claims priority benefit of German Application No. DE 10 2016 102 469.4 filed on Feb. 12, 2016, the contents of which is incorporated by reference in its entirety.

FIELD OF THE INVENTION

The invention relates to an optical mount comprising an inner ring designed to receive an optical element to be mounted and an outer ring arranged coaxially to the inner ring, said inner ring being adjustable with respect to said outer ring via manipulator units and being fixable, independently of said manipulator units, via clamping units. An optical mount of the same generic type is known from DE 10 2015 101 384 B3.

BACKGROUND OF THE INVENTION

Mounts of this type are preferably manufactured monolithically. This means that the mount, which is divided into an inner ring and an outer ring, is manufactured by forming slots in a base body, while preserving some material connections between the inner ring and the outer ring. A large number of such mounts known from the prior art differ, in particular, in the design of these remaining material connections, which are substantially defined by the position, geometry and dimensions of the slots and mostly constitute bars or arrangements of bars. Actuators supported in the outer ring, e.g. adjusting screws, act on at least two of said material connections. By initiating an adjustment travel by means of one of said actuators into one of said material connections, the inner ring, and thus the inner ring axis, is moved with respect to the outer ring, and thus the outer ring axis, by a displacement path. The optical element, and thus the optical axis of an optical element mounted in the inner ring, having a fixed position with respect to the inner ring axis allows the position of the optical axis to be adjusted.

The design of the material connections and the direction of an adjustment travel initiated determine the direction of the resulting displacement path and the sensitivity of the translation of the adjustment travel. The design and number of the material connections also determine the rigidity or flexibility, respectively, of the material connections between the inner and outer rings perpendicular to the adjustment plane.

German published patent application DE 199 01 295 A1 discloses an optical assembly with a monolithic mount of the same type, consisting of an outer ring (called outer mount therein) and an inner ring as well as differently designed material connections between the inner ring and the outer ring. The differently designed material connections form solid state hinges or transmissions consisting of solid state hinges.

According to the aforementioned DE 199 01 295 A1, one respective radially acting actuator (in this case, an adjusting screw) acts on each of the material connections in one embodiment of the optical assembly. In the sense of the invention, a respective material connection cooperates with a respective actuator to form a manipulator unit. The adjustment travels respectively initiated by both adjusting screws are sensitively reduced to displacement paths that are independent of each other. In this case, the sensitivity is respectively determined by the transmission of the adjusting screw, the transmission of the lever mechanism and the conversion of the translational movement into a rotary motion about a center of rotation.

This mount is designed for a very small adjustment range, probably from 10-20 μm, and a very sensitive adjustment, probably with a resolution greater than 2 μm, which can be explained by the very low transmission ratio (also referred to as high reduction ratio) of the adjustment travel initiated by the adjustment levers to the resulting displacement paths. The connections are rigid in an axial direction and flexible in a radial direction so as to enable effortless adjustment.

A similar mount with a comparatively larger adjustment range is known from DE 10 2013 109 605 B3. The manipulator units differ from those of the aforementioned DE 199 01 295 A1 in that the material connections forming them are formed by slots with a different geometry. Advantageously, further material connections are present with no adjusting screws acting on them, which, therefore, do not form manipulator units. They merely serve to axially reinforce the mount and can be provided in any number and in any position.

The material connections forming part of the manipulator units are formed by bars having a flexibility distributed over their length. The bars can also be made thicker over their length and thus relatively stiff, if they are tapered at the junctions to the inner ring or the outer ring, respectively, so that these junctions have high flexibility and form flexure hinges. Regardless of their design, the material connections thus formed are soft in a radial direction.

A mount according to DE 10 2013 109 605 B3, mentioned above, is less sensitive than that of DE 199 01 295 A1, also mentioned above, due to a comparatively low reduction of the initiated adjustment travels to displacement paths. In this case, the resolution is 1-2 μm. However, it is suitable for a larger adjustment range of up to approx. 100 μm and can be designed such that it needs to be accessible from one side only for adjustment.

U.S. Pat. No. 7,916,408 B2 discloses an example of a non-monolithic mount, which also consists of an outer ring and a radially adjustable inner ring, arranged coaxially to said outer ring. For adjustment, there are adjusting screws screwed into the outer ring, said adjusting screws enclosing a right angle with each other in a radial direction and each acting indirectly, via a ball, on a pin which indirectly contacts the inner ring via a second ball. Such an arrangement is a manipulator unit in the sense of the invention. Screwing the adjusting screws in causes the inner ring to be displaced in a radial plane. A restoring force opposed to the adjusting screws is caused by a spring-mounted element which contacts the inner ring tangentially. As in the aforementioned monolithic mounts, the manipulator units are soft, i.e. elastic, in the radial plane.

Both the indicated monolithic mounts and the indicated non-monolithic mount are shown by way of example only and could be supplemented by a multiplicity of further mounts of the same type. What they all have in common is that the mount can be moved in a plane perpendicular to the mount axis, which corresponds to the outer ring axis. That is to say, forces acting in this plane may temporarily lead to a basically reversible deflection of the inner ring from its adjustment position. Usually, the positional deviations from the adjustment position of the optical element held in the mount, which result from hysteresis during the return to the adjustment position, are so small as to be within an acceptable tolerance. Where very high precision and stability requirements apply to an optical system, e.g. in the case of high external loads and a required resolution of <1 µm, these positional deviations may, however, be outside said tolerance. Therefore, when very high precision and stability requirements apply, it is of interest to stabilize the adjusted optical element in its adjustment position. In this connection, it is important to ensure, in particular, that no misalignment results from the position stabilization itself.

The aforementioned DE 10 2015 101 384 B3 discloses a mount which comprises an outer ring and an inner ring for holding an optical element, said inner ring being arranged coaxially to the outer ring and being radially adjustable by manipulator units, wherein the inner ring is positionally stabilized, with respect to the outer ring, by the manipulator units in an independent manner via clamping units. The clamping units each comprise two clamping strips, securely connected to the inner ring at one end, two clamping jaws and a pressure screw. As the pressure screw is screwed into the outer ring, the clamping jaws are moved apart, and the clamping strips are clamped against the outer ring, thereby fixing the position of the inner ring and the outer ring relative to each other.

The design of an optical mount according to the aforementioned DE 10 2015 101 384 B3 is justified, in particular, if the fixation of the relative position between the inner ring and the outer ring is intended to be releasable and/or if the mount is exposed to environmental impacts or optical radiation, making adhesives unsuitable for use. This mount has the disadvantage of being very complex both in terms of its mechanism and its manufacture.

SUMMARY OF THE INVENTION

It is an object of the invention to provide an optical mount with clamping units, which act independently of manipulator units and are comparatively easier to manufacture and thus less expensive.

BRIEF DESCRIPTION OF THE INVENTION

The invention will be explained in more detail below with reference to drawings, wherein:

FIG. 1 shows a schematic diagram of an optical mount with manipulator units and clamping units, and FIGS. 2 to 9 show various embodiments of the clamping unit.

DETAILED DESCRIPTION OF THE INVENTION

Embodiments of an optical mount according to the invention, as shown in FIG. 1, comprise an outer ring 1 with an axis, referred to hereinafter as mount axis 1.1, an inner ring 2, arranged coaxially thereto, and at least two manipulator units 3, which connect the outer ring 1 and the inner ring 2 and by means of which the inner ring 2 is adjustable with respect to the outer ring 1 in an adjustment plane perpendicular to the mount axis 1.1. The manipulator units 3 may be embodied in any form as long as they allow adjustment of the inner ring 2 within the outer ring 1. Examples of possible embodiments of the manipulator units 3 are disclosed in the publications acknowledged in the description of the prior art, all of which are incorporated herein by reference in their entireties.

In addition to these aforementioned features, which an optical mount according to the invention has in common with prior art mounts of the same type, an optical mount of the invention, as known from the aforementioned DE 10 2015 101 384 B3, includes at least one, and preferably three, clamping units 0, which are incorporated in the outer ring 1 and act independently of the manipulator units 3. The at least one clamping unit 0 is arranged between adjacent manipulator units 3. Once the inner ring 2 has been moved into an adjustment position with respect to the outer ring 1 via the manipulator units 3, the clamping unit 0 allows to fix the inner ring 2 in said adjustment position.

FIG. 1 is a schematic diagram of an optical mount according to the invention, which merely shows an example of the arrangement of the manipulator units 3 and the clamping units 0 in the optical mount without depicting any specific embodiment.

An optical mount according to the invention basically comprises two, preferably three, manipulator units 3, which are spatially integrated in the outer ring 1. Basically, one clamping unit 0 is sufficient, but two or, even better, three are advantageous. They are also integrated in the outer ring 1, between the manipulator units 3. The clamping units 0 should then be arranged with equal angular distances between them. Preferably, the number of manipulator units 3 and the number of clamping units 0 are the same, and the clamping units 0 are arranged at the same angular distances from adjacent manipulator units 3. When two clamping units 0 are used, they are preferably positioned perpendicular to each other in a plane, i.e. the clamping plane, perpendicular to the mount axis 1.1. The clamping plane and the plane in which the manipulator units 3 are located, i.e. the manipulator plane, coincide. However, the clamping plane and the manipulator plane may also be arranged parallel to each other for space reasons.

All embodiments of the clamping units 0 are formed by a threaded hole 4, which is directed radially to the mount axis 1.1 in the outer ring 1, and a screw 5 supported in said threaded hole 4, said screw 5 comprising a screw axis 5.0 directed radially to the mount axis 1.1, an externally accessible top end 5.1 and a bottom end 5.2 which encloses an adhesive gap 7 together with the inner ring 2, at least in the adjustment position. The screw 5 has a through hole 8 along the screw axis 5.0 through which an adhesive 6 is introduced into the adhesive gap 7 in order to produce a clamping state of the inner ring 2 in the outer ring 1.

FIGS. 2 to 9 show various advantageous embodiments of the clamping units 0, with the illustrated embodiments showing only some of the possible advantageous embodiments. The differently embodied features can be combined with each other as long as there is an adhesive gap 7 between the screw 5 and the inner ring 2 in the adjustment position, in which the clamping unit 0 is fixed, i.e. put in a clamping state.

Ideally, the clamping unit 0 should exert no forces or, at the most, forces which are either neutralized by the effect of several clamping units 0 or are so marginally small that the adjustment position is maintained.

The following observations refer to only one clamping unit 0 and apply equally to any further clamping units 0 of the same optical mount.

Various measures can be taken to ensure the clamping unit 0 has an adhesive gap 7 in the adjustment position.

Firstly, prior to adjustment, the screw 5 can be screwed into the outer ring 1 to the extent that an adhesive gap 7 exists over the entire adjustment range, which adhesive gap 7 is greater than the maximum adjusting movement of the inner ring 2 with respect to the outer ring 1 during adjustment. However, after adjustment the adhesive gaps 7 of the several clamping units 0, if applicable, may differ in size.

Due to the shrinkage of the adhesive 6, which is then introduced in different amounts into the clamping units 0, this could result in different levels of tensile force, which would then not compensate each other to zero. Advantageously, the tolerance and manufacture of this variant always result in a very small adhesive gap 7.

Secondly, the screws 5 may be screwed in to result in an adhesive gap 7 equaling zero, in the adjustment position of the optical mount, and then unscrewed again in a defined manner, so as to result in defined adhesive gaps 7 with the same width for all adhesive gaps 7 of an optical mount. The defined unscrewing and filling of the adhesive gaps 7 with adhesive 6 can be done under supervision and may also be done with a time lag after the adjustment.

The first and second measures pointed out are carried out in connection with a radially rigid boundary surface of the adhesive gap 7 at the inner ring 2, as explained below with reference to the embodiments shown in FIGS. 1, 2, 3, 4, 5, 6, and 7.

Figure 8:
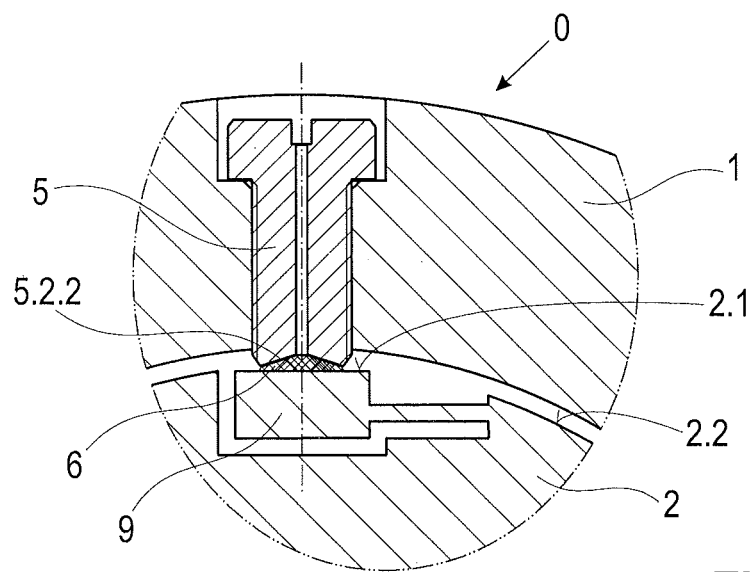
Figure 9:
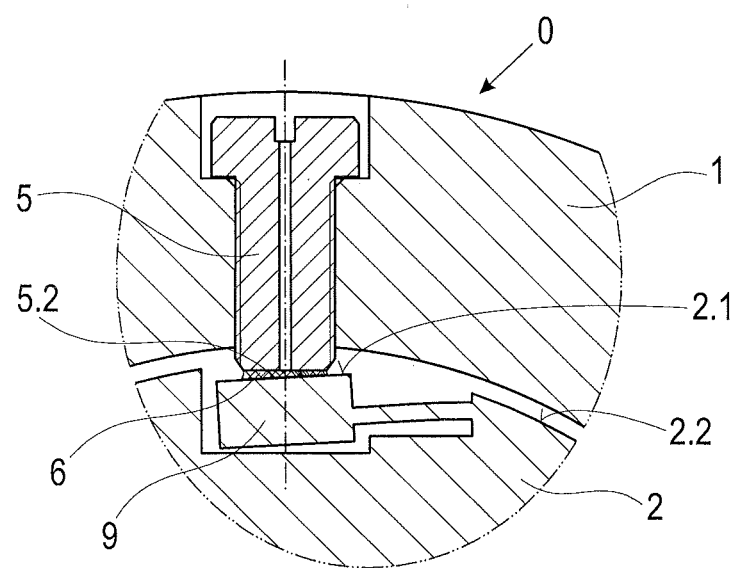

In the embodiments shown in FIGS. 8 and 9, the boundary surface of the adhesive gap 7 is radially elastic. By biasing a bending part 9 at which said boundary surface is formed, the boundary surface is tilted with respect to the screw axis 5.0 and encloses an angle with the bottom end 5.2 of the screw 5, which may optionally form a planar face 2.1, said angle then determining the adhesive gap 7. The adhesive gap 7 of the, if necessary, several clamping units 0 of an optical mount is then nearly equal, in particular for small actuations and need not be set after the adjustment.

Figure 2:
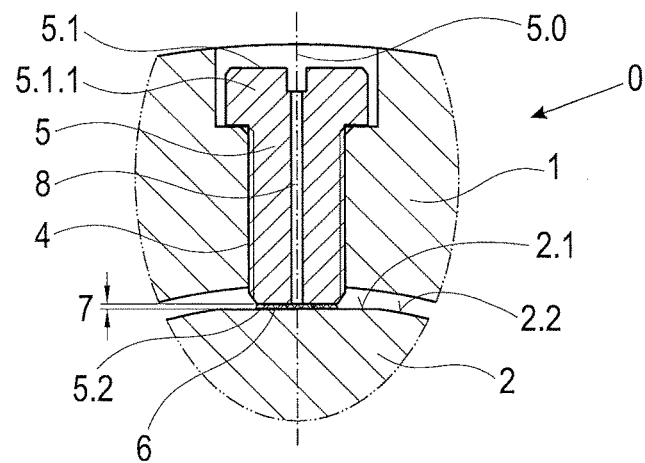

FIG. 2 shows a first embodiment of a clamping unit 0.

A screw head 5.1.1 is formed at the top end 5.1 of the screw 5, said screw head 5.1.1 being screwed against a stop on the outer ring 1 and thus limiting the screw-in depth of the screw 5. In the clamped state, the screw 5 is drawn towards said stop by the shrinkage of the adhesive 6.

The bottom end 5.2 forms a planar face and the surface limiting the adhesive gap 7 on the side of the inner ring 2 is a planar surface 2.1 formed by a chamfer on the peripheral surface 2.2 of the inner ring 2.

Figure 3:
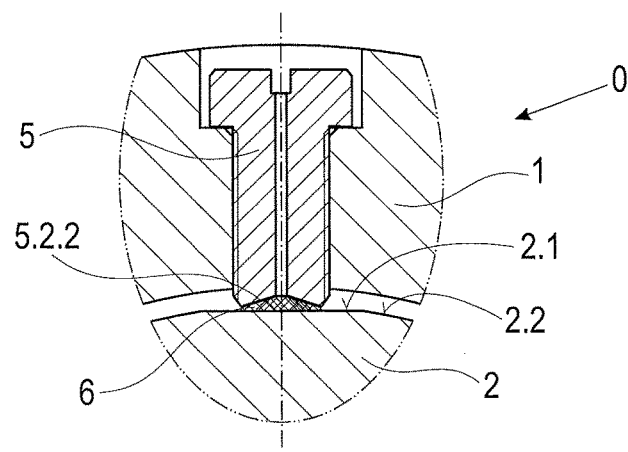
Figure 4:
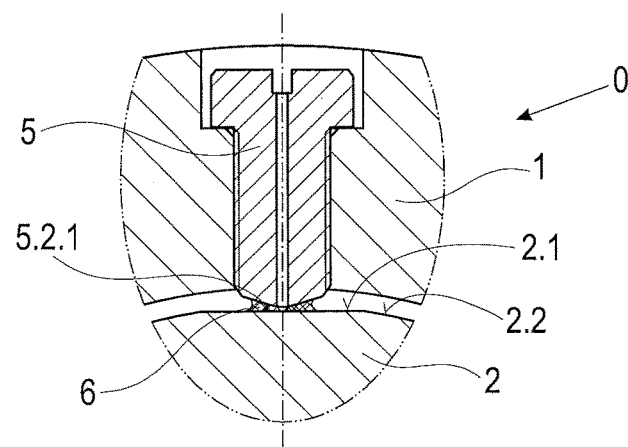
Figure 5:
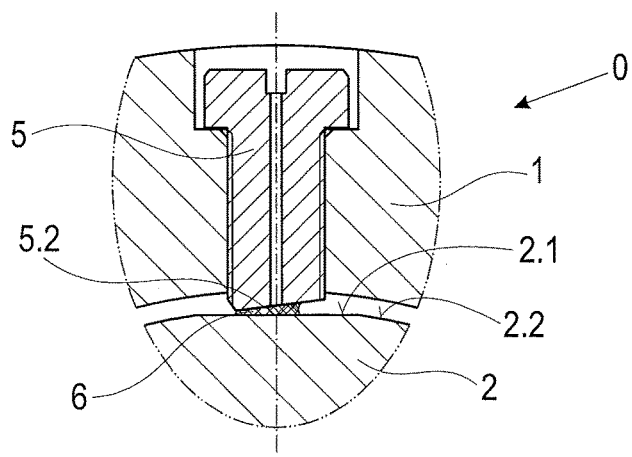

The embodiments of FIGS. 3, 4 and 5 differ from the aforementioned embodiment in that the bottom end 5.2 of the screw 5 is formed by an inward tapered surface 5.2.2, an outward tapered surface 5.2.1 or a planar face inclined with respect to the screw axis 5.0, respectively. This allows more adhesive 6 to be introduced, while the dimensions of the optical mount are otherwise the same.

Figure 6:
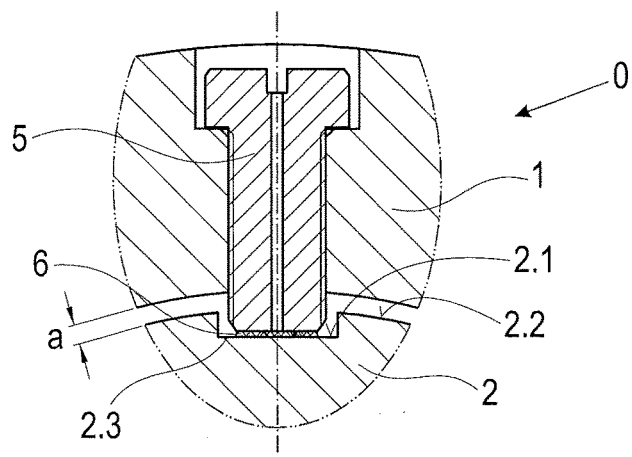
Figure 7:
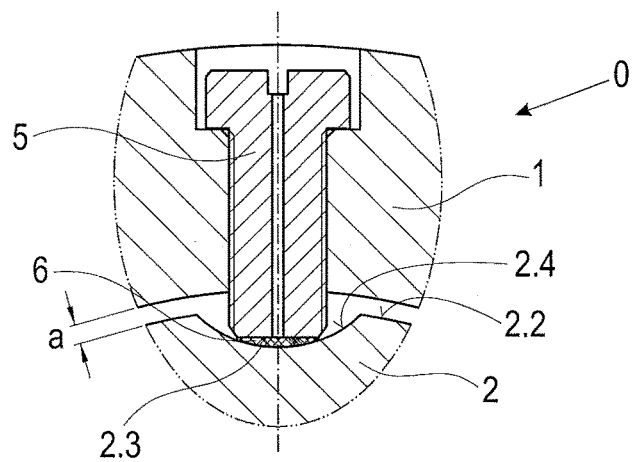

In order to allow the gap distance a between the inner peripheral surface of the outer ring 1 and the outer peripheral surface of the inner ring 2 to be dimensioned merely depending on the adjustment range, a depression 2.3 is provided on the peripheral surface 2.2 of the inner ring 2 in a further embodiment shown in FIGS. 6 and 7. In addition, only limited local contact of the adhesive 6 with the inner ring 2 is ensured here as well.

FIGS. 8 and 9 show two embodiments in which the planar surface 2.1 is formed on a radially elastic bending part 9, which is monolithically connected with the inner ring 2. In both embodiments, the screw 5 has surface contact with the bending part 9 in the adjustment position. It is not mandatory for the bending part 9 to be deflected and, thus, biased, if the bottom end 5.2, as shown in FIG. 8, does not have a planar face, but e.g. an inward tapered surface 5.2.2. Advantageously, however, all clamping units 0 of a mount are biased in the adjustment position. If the bottom ends 5.2 are each embodied as planar faces, they will each enclose an at least nearly identical angle with the individual bending parts 9 of the clamping units 0. Forces acting due to shrinkage of the adhesive 6 will be very small due to the small respective width of the adhesive gap 7; they will at least nearly compensate each other, and any remaining difference will not affect the adjustment position, because it will not be rigidly transmitted to the inner ring 2.

It is not mandatory for the surface bounding the adhesive gap 7 at the inner ring 2 to be a planar surface 2.1, which, as already pointed out, is formed e.g. at a chamfer on the peripheral surface 2.2, in a depression 2.3 or on an elastic bending part 9. It may also be practically a portion of a cylindrical peripheral surface or, for example, a concave surface 2.4 formed thereon. The screw 5 may also be a grub screw without a screw head 5.1.1, which is then advantageously fixed in its position in the outer ring 1 by an adhesive 6 as well.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 0 clamping unit
1 outer ring
1.1 mount axis
2 inner ring
2.1 planar surface
2.2 peripheral surface
2.3 depression
2.4 concave surface
3 manipulator unit
4 threaded hole
5 screw
5.0 screw axis
5.1 top end (of the screw 5)
5.1.1 screw head (of the screw 5)
5.2 bottom end (of the screw 5)
5.2.1 outward tapered surface
5.2.2 inward tapered surface
6 adhesive
7 adhesive gap
8 through hole
9 bending part
a gap distance

What is claimed is:

1. An optical mount with at least one clamping unit, comprising an outer ring having a mount axis, an inner ring arranged coaxially with said inner ring, and at least two manipulator units which connect the outer ring and the inner ring and by means of which the inner ring is adjustable with respect to the outer ring in an adjustment plane perpendicular to the mount axis, said at least one clamping unit arranged within the outer ring and located between two of the manipulator units, said at least one clamping unit formed by a threaded hole, said threaded hole being directed radially to the mount axis in the outer ring, and a screw supported in said threaded hole, said screw having a screw axis directed radially to the mount axis, an externally accessible top end and a bottom end which, in a clamping state, is connected with the inner ring via an adhesive gap filled with adhesive, wherein the screw has a through hole along the screw axis for filling the adhesive gap with the adhesive.

2. The optical mount with at least one clamping unit according to claim 1, wherein said adhesive gap borders on a planar surface formed on the inner ring.

3. The optical mount with at least one clamping unit according to claim 1, wherein said bottom end of the screw is formed by an inwardly tapered surface.

4. The optical mount with at least one clamping unit according to claim 2, wherein said bottom end of the screw is formed by an inwardly tapered surface.

5. The optical mount with at least one clamping unit according to claim 1, wherein said bottom end of the screw is formed by an outwardly tapered surface.

6. The optical mount with at least one clamping unit according to claim 2, wherein said bottom end of the screw is formed by an outwardly tapered surface.

7. The optical mount with at least one clamping unit according to claim 2, wherein said planar surface is formed by a chamfer on a peripheral surface of the inner ring.

8. The optical mount with at least one clamping unit according to claim 2, wherein said planar surface is arranged in a depression located on a peripheral surface of the inner ring.

9. The optical mount with at least one clamping unit according to claim 2, wherein said planar surface is formed on a radially elastic bending part which is monolithically connected with the inner ring.

10. The optical mount with at least one clamping unit according to claim 9, wherein said bending part is biased in the clamping state.

11. The optical mount with at least one clamping unit according to claim 1, wherein said adhesive gap borders on a concave surface formed on the inner ring.

* * * * *